United States Patent [19]

Lowenschuss

[11] 4,217,580
[45] Aug. 12, 1980

[54] ELECTRONIC COUNTERMEASURE SYSTEM

[75] Inventor: Oscar Lowenschuss, Goleta, Calif.

[73] Assignee: Raytheon Company, Lexington, Mass.

[21] Appl. No.: 707,915

[22] Filed: Jul. 22, 1976

[51] Int. Cl.² .............................................. G01S 9/02
[52] U.S. Cl. ........................... 343/5 DP; 343/5 SA; 343/18 E
[58] Field of Search .............. 343/18 E, 5 DP, 5 SA; 324/77 R; 325/132, 321, 325, 333, 435, 474

[56] References Cited

U.S. PATENT DOCUMENTS

| | | | |
|---|---|---|---|
| 3,693,100 | 9/1972 | Brown | 325/321 |
| 3,701,153 | 10/1972 | Gagliardi et al. | 343/5 SA |
| 3,781,888 | 12/1973 | Bail | 343/5 DP |
| 3,786,504 | 1/1974 | Collins | 343/5 SA |
| 3,827,027 | 7/1974 | Towson et al. | 343/5 DP |
| 3,881,101 | 3/1975 | Pederson et al. | 343/5 DP |
| 3,964,064 | 6/1976 | Brandao et al. | 343/5 SA |
| 3,971,021 | 7/1976 | Cann | 343/18 E |
| 4,005,417 | 1/1977 | Collins | 343/5 SA |
| 4,025,920 | 5/1977 | Reitboeck | 343/5 DP |
| 4,040,054 | 8/1977 | Overman | 343/18 E |
| 4,068,233 | 1/1978 | Pease et al. | 343/5 DP |

Primary Examiner—Howard A. Birmiel
Attorney, Agent, or Firm—Richard M. Sharkansky; Joseph D. Pannone

[57] ABSTRACT

An electronic countermeasure system wherein signal processing apparatus is included to enable only a predetermined number of digital words associated with one of a plurality of radio frequency energy sources to pass to a general purpose digital computer. Also, such signal processing apparatus modifies the digital word passed to such digital computer to simplify the processing required by such digital computer.

8 Claims, 5 Drawing Figures

ELECTRONIC COUNTERMEASURE SYSTEM

BACKGROUND OF THE INVENTION

This invention relates generally to electronic countermeasure systems and more particularly to systems of such type which use digital computers for automatically identifying radio frequency (R.F.) energy sources and assigning countermeasures to such sources when required.

As is known in the art, early electronic countermeasure (ECM) systems received signals from various R.F. energy sources and presented the locations of such sources on a suitable display, such as a cathode ray tube (CRT). An operator would observe the CRT display, tune his receiver to separate in frequency each of the R.F. energy sources, perform manual direction finding, select the appropriate R.F. energy source to be jammed and transmit an appropriate jamming modulation. Other early ECM systems used repeater jammers which transmitted all signals received in a fixed frequency bandpass. A shortcoming of these early ECM systems was that they did not provide automatic R.F. energy source identification and prioritization.

In more modern ECM systems the signal processing R.F. energy source identification and jamming assignment must be done automatically because the R.F. energy source environment, both friendly and hostile, may be so dense that a single operator would not generally be able to perform the R.F. energy source identification task. Such a modern ECM system generally includes receiving equipment, signal processing equipment, a general purpose computer, displays and signal generator and transmission equipment. The receiving equipment and signal processing equipment convert various characteristics of each R.F. energy source into a digital word. These characteristics are typically the R.F. energy source's time of arrival (TOA), angle of arrival (AOA), pulsewidth, amplitude and frequency. These digital words are fed to a general purpose digital computer which provides an appropriate display for the operator and also automatically assigns jamming resources on a somewhat optimum basis to the threatening R.F. energy sources.

In order to establish whether received radio frequency signals are from a valid R.F. energy "emitter" or from "noise," and in order to calculate the pulse repetition interval (PRI) of such signal and thereby establish the characteristics of a valid emitter so that R.F. energy source identification becomes more accurate, it is necessary to sort the received signals so that received signals from the same R.F. energy source are grouped together. The basic idea behind conventional sorting is as follows: For each received radio frequency pulse, the observable parameters (frequency, pulse width, AOA, TOA, etc.) are converted into different portions of a corresponding digital word. Thereafter, when another pulse is received having similar parameters it can be assumed that this pulse came from the same R.F. energy source as the preceding pulse. For example, if a pulse is received at 3.792 GHz and an azimuth of 208° and another pulse 1 millisecond later is received having a frequency 3.793 GHz and an azimuth of 208° it is very likely that the two pulses came from the same R.F. energy source. Unfortunately, during the 1 millisecond interval the receiving apparatus may have received hundreds of pulses from other R.F. energy sources. However, if there were a hundred radars operating at the same time, each with a pulse repetition interval of about 1,000 pulses per second, the environment would comprise 100,000 pulses per second. Thus, on the average there would be 10 microseconds available to sort each one of the incoming pulses into one of a hundred possible R.F. energy sources. If the comparisons were made sequentially, each incoming pulse would have to be compared against 100 R.F. energy sources (or less) whose characteristics were previously observed. In the worst case, the time available for each one of the 100 comparisons is 0.1 microseconds. In view of the present state of the digital computer art such speed requirement means that conventional data processing approaches to data sorting would not be practical.

SUMMARY OF THE INVENTION

With this background of the invention in mind it is therefore an object of this invention to provide an improved electronic countermeasure (ECM) system.

It is another object of this invention to provide an improved electronic countermeasure (ECM) system using digital computer processing wherein such system is adapted to enable such computer system to operate on a reduced number of R.F. energy source signals and to identify such signals so that succeeding data processing is simplified.

These and other objects of the invention are attained generally by providing, in a radio frequency receiver system adapted to receive signals from a plurality of radio frequency energy sources and convert such signals into a sequence of digital words representing characteristics of such sources and including a digital computer having a memory adapted to store in locations thereof digital words coupled thereto through an improved signal processing apparatus, such signal processing apparatus comprising: Means for enabling a predetermined number of digital words associated with one of the R.F. energy sources to become stored in selected locations of such memory; and, means for modifying such digital words passed to such memory to provide an indication of the location in such memory of the previously stored digital word associated with such one of the R.F. energy sources.

With such an arrangement, because only the predetermined number of signals is required for R.F. energy source identification and prioritization by the general purpose digital computer, such general purpose digital computer need be interrupted only on identification of a new R.F. energy source. Also, the modification of the digital word passed to such digital computer simplifies the processing required by such digital computer.

BRIEF DESCRIPTION OF THE DRAWINGS

For a more complete understanding of this invention reference is now made to the following description of a preferred embodiment of this invention as illustrated in the accompanying drawings in which.

DESCRIPTION OF THE PREFERRED EMBODIMENT

Figure 1:
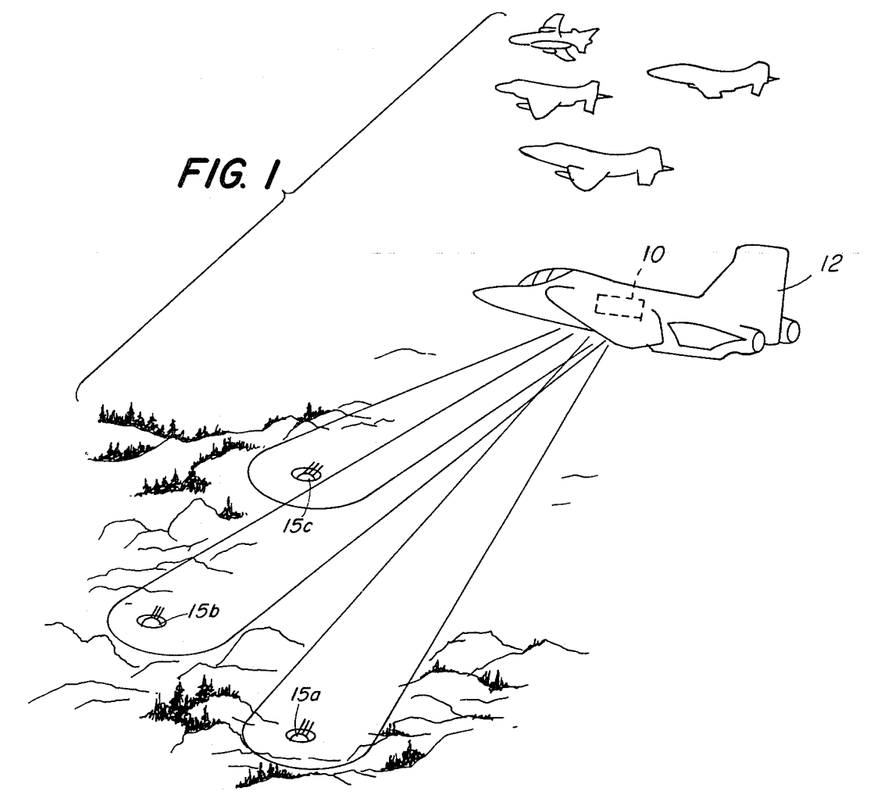
FIG. 1 is a sketch, greatly simplified and somewhat distorted, showing a fleet of aircraft and an accompanying escort jamming aircraft, the latter aircraft carrying electronic countermeasure (ECM) equipment according to the invention.
Figure 2:
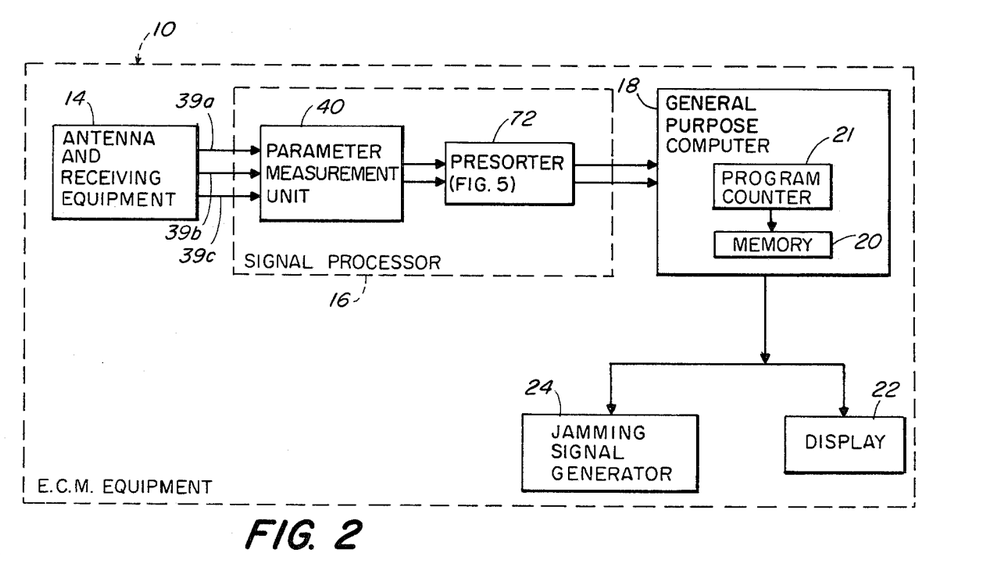
FIG. 2 is a block diagram of the ECM equipment carried by the escort jamming aircraft shown in FIG. 1.

Referring now to FIGS. 1 and 2, electronic countermeasure (ECM) equipment 10 is shown carried on board an escort jammer aircraft 12. The ECM equipment 10 includes: Antenna and receiving equipment 14, adapted to receive radio frequency (R.F.) signals from a plurality of R.F. energy sources (here pulse radar guided missile batteries indicated by the numerals 15a–15c); a signal processor 16, for converting such signals into digital words representative of various characteristics of such R.F. energy sources; a general purpose digital computer 18, including a conventional memory 20 and program counter 21, for sorting the received signals (i.e. digital words) so that such signals are associated with specific ones of such R.F. energy sources 15a–15c and for identifying and assigning priority to such R.F. energy sources; a conventional display 22 for identifying such R.F. energy sources; and, a conventional jamming signal generator 24 for transmitting suitable R.F. countermeasure against those R.F. energy sources which represent the greatest threat as decided by the general purpose digital computer 18 and/or operator (not shown) through the use of the display 22.

Figure 3:
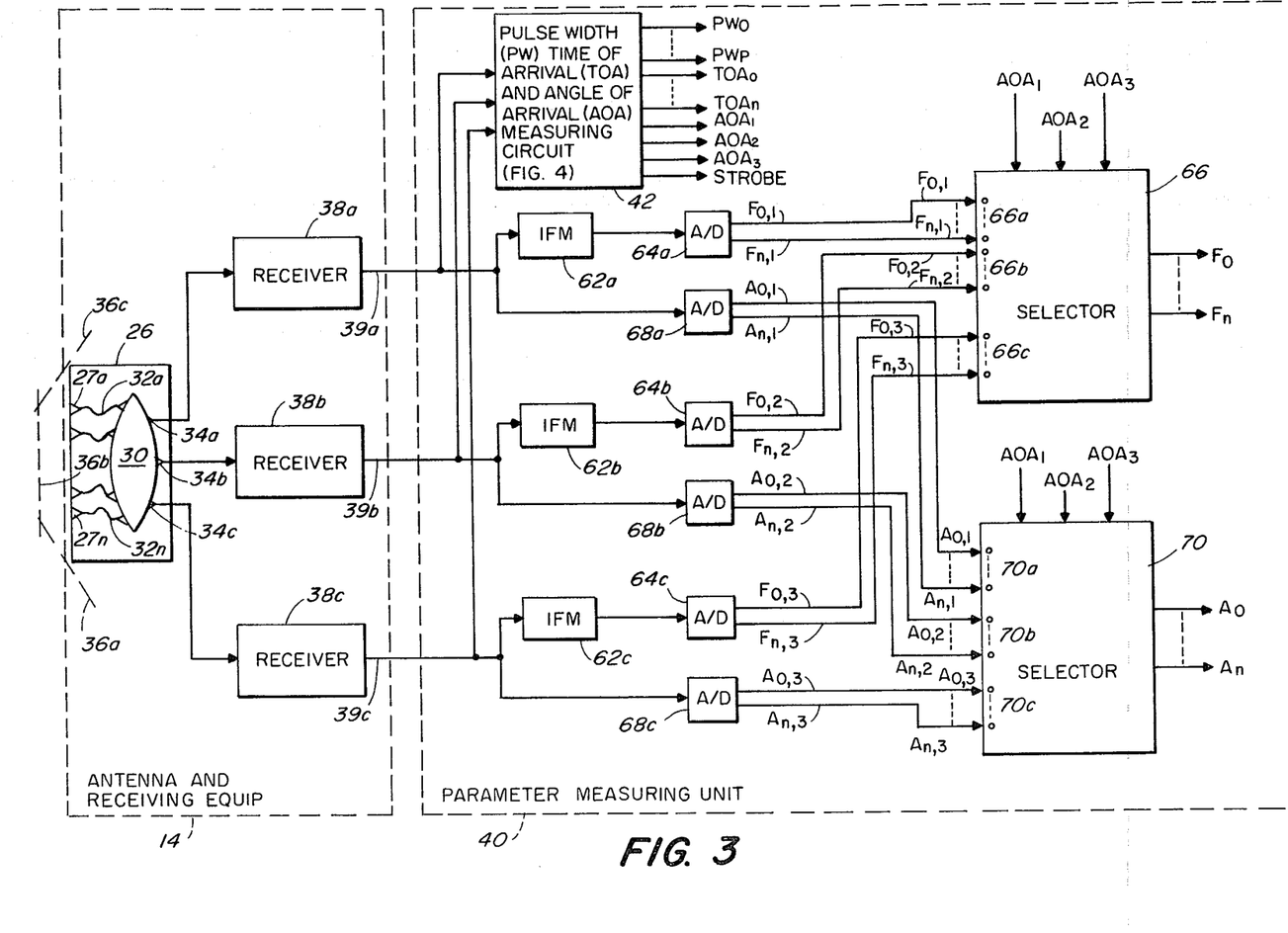
FIG. 3 is a block diagram of antenna and receiving equipment and a parameter measurement unit used in the ECM equipment of FIG. 2.
Figure 4:
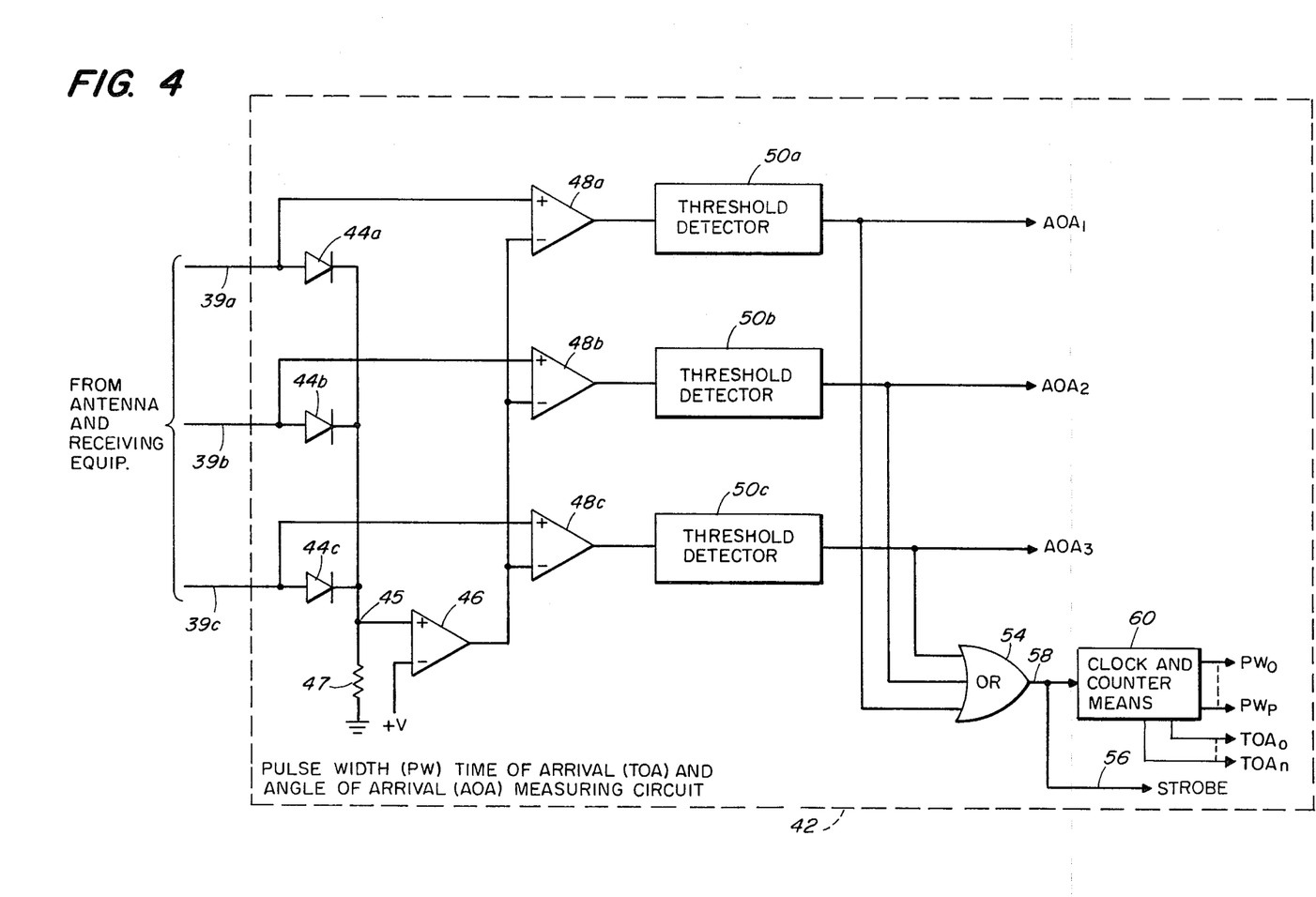
FIG. 4 is a block diagram of a pulse width, time of arrival and angle of arrival measuring circuit used in the parameter measurement unit shown in FIG. 3.

Referring to FIG. 3, antenna and receiving apparatus 14 is shown to include a conventional multibeam array antenna 26. For simplicity it has been selected to show an array antenna having three simultaneously existing beams, although it should be recognized that a greater number of beams would ordinarily be desired. Such multibeam array is described in U.S. Pat. No. 3,761,936, issued Sept. 25, 1973, inventors Donald H. Archer et al, assigned to the same assignee as the present invention. As is described in U.S. Pat. No. 3,715,749, issued Feb. 6, 1973, inventor Donald H. Archer, entitled "Multi-Beam Radio Frequency System" and assigned to the same assignee as the present invention, a linear array of antenna elements 27a–27n is coupled to a parallel plate lens 30 through a similar plurality of transmission lines 32a–32n. The feed ports 34a–34c, here three, are disposed along an arc of best focus of the parallel plate lens 30. The antenna is constructed so that a length of electrical path from the feed port 34a to the planar wavefront 36a is the same for the radio frequency energy entering any one of the antenna elements 27a–27n; the length of electrical path from the feed port 34b to any point on the planar wavefront 36b is the same; and the length of electrical path from the feedport 34c to any point on the planar wavefront 36c is the same. Each one of such wavefronts may here be considered as being associated with each one of the R.F. energy sources 15a through 15c. That is, the wavefront 36a is associated with energy from R.F. energy source 15a and may be considered as being received at an angle of arrival (AOA$_1$). Likewise, R.F. energy sources 15b and 15c may be considered as being associated with wavefronts 36b and 36c, respectively, and being received at angles of arrival AOA$_2$ and AOA$_3$, respectively. It follows then that radio frequency energy from R.F. energy sources 15a through 15c become focused to receivers 38a through 38c, respectively. Such receivers 38a through 38c are conventional receivers, here having logarithmic detectors. Such receivers are described in *Radar Handbook*, Editor-In-Chief Skolnik, published by McGraw-Hill Inc., 1970, pgs. 5-31 through 5-36. Here the output of the receiver is represented by 100 millivolts per decibel (db). The outputs of receivers 38a through 38c are coupled, via lines 39a through 39c, respectively, to a parameter measurement unit 40. Parameter measurement unit 40 is shown in detail in FIG. 3. As shown, such parameter measurement unit 40 includes a pulse width, time of arrival and angle of arrival measuring circuit 42. The pulse width, time of arrival and angle of arrival measuring circuit 42 is shown in FIG. 4 to include three diodes 44a through 44c, each one being coupled to lines 39a through 39c, respectively, as shown. Lines 39a through 39c are also coupled to comparator amplifiers 48a through 48c, respectively, as shown. The outputs of diodes 44a through 44c are coupled to terminal 45. A resistor 47 is coupled between such terminal 45 and ground. Terminal 45 is also coupled to one input of an operational amplifier 46. The other input of such operational amplifier 46 is coupled to a +V voltage supply. Here such +V voltage represents about 3 db of input signal (i.e. 0.3 volts). (It is noted, for reasons to become apparent, that the voltage +V is selected in accordance with the probability that two signals received simultaneously will differ in amplitude by less than such +V volts.) The output of operational amplifier 46 is coupled to comparator amplifiers 48a through 48c, as shown. In operation the voltage appearing at terminal 45 will be the largest of the voltages on line 39a through 39c. For example, if the voltage on lines 39a–39c were, say, 2.8 volts, 0.9 volts and 0.8 volts respectively, diodes 44b and 44c would "open" and the largest voltage, i.e. 2.8 volts, would pass through diode 44a and appear at terminal 45. From the 2.8 volts at terminal 45 0.3 volts is subtracted by the operational amplifier 46. Hence the output of operational amplifier 46 would be, in this example, 2.5 volts. Under such condition comparator 48a would produce a "high" signal whereas comparator amplifiers 48b and 48c would produce "low" signals. The signals produced at the outputs of amplifiers 48a through 48c are passed to lines AOA$_1$ through AOA$_3$ via threshold detectors 50a through 50c as shown. It follows, then, that a binary signal is produced on lines AOA$_1$ through AOA$_3$. Such signal may be either 100, 010 or 001, assuming that the amplitude of the signals on lines 39a through 39c differ by more than 3 db for reasons discussed above. The binary words on lines AOA$_1$ through AOA$_3$ then represent the angle of arrival of the R.F. energy source signal being received. More specifically, the digital word 100 on such lines AOA$_1$–AOA$_3$ indicates that signals from R.F. energy source 15a are being received. The digital word 010 on lines AOA$_1$–AOA$_3$ indicates that signals from R.F. energy source 15b are being received and the binary word 001 on lines AOA$_1$–AOA$_3$ indicates that signals from R.F. energy source 15c are being received. Lines AOA$_1$–AOA$_3$ are coupled to an OR gate 54. The OR gate 54 is coupled, via line 58, to a clock and counter means 60 and to a strobe line 56. Clock and counter means 60 is here of any conventional design which, in response to a "high" signal on line 58, measures the time duration of such "high" signal and converts the time duration of such "high" signal into a digital word. Such clock and counter means 60 also determines the time of arrival (TOA) (within a predetermined dwell interval) of the received signal. It follows then that the digital word produced at the output of clock and counter means 60 appearing on lines $TOA_o$-$TOA_n$ represents the time of arrival of the received signal and the digital word appearing on lines $PW_o$-$PW_p$ represents the pulse width (PW) of the received signal. It is also noted that strobe line 56 goes "high" in response to the reception of energy from any one of the R.F. energy sources.

Referring again to FIG. 3, parameter measurement unit 40 is also shown to include three instantaneous frequency measuring (IFM) units 62a, 62b, 62c, such units being coupled to lines 39a through 39c respectively, as shown. Such instantaneous frequency measuring (IFM) units are of any conventional design and provide an analog signal proportional to the frequency of the signal applied thereto. Analog-to-digital (A/D) converters 64a through 64c are provided to convert the voltages produced at the outputs of IFM units 62a-62c, respectively, to corresponding digital words. The digital words produced by A/D converters 64a through 64c are coupled to a selector 66. Selector 66 has three input terminals 66a, 66b and 66c. Terminal 66a is coupled to the output of A/D converter 64a, input terminal 66b is coupled to the output of A/D converter 64b and input terminal 66c is coupled to the output of A/D converter 64c. The output of selector 66, i.e. lines $F_o$-$F_n$, are coupled to one of the input terminals 66a-66c selectively in response to the digital word applied thereto via lines $AOA_1$-$AOA_3$. That is, if the digital word on lines $AOA_1$-$AOA_3$ is 100, input terminal 66a becomes coupled to lines Fo-$F_n$; if such digital word on lines $AOA_1$-$AOA_3$ is 010, input terminal 66b becomes coupled to lines $F_o$-$F_n$; or if the digital word on lines $AOA_1$-$AOA_3$ is 001, terminal 66c becomes coupled to lines $F_o$-$F_n$. It follows, then, that the frequency of the received R.F. energy source becomes converted to a digital word and coupled to lines 39a-39c, respectively, as shown. The outputs of A/D converters 68a-68c are coupled to a selector 70. More specifically, A/D converters 68a-68c are coupled to the input ports 70a through 70c of selector 70. Input ports 70a-70c become coupled to the output of selector 70, i.e. on lines $A_o$-$A_n$, selectively in response to the digital word applied to lines $AOA_1$-$AOA_3$. That is, the operation of selector 70 is similar to the operation of selector 66 and therefore a digital word representative of the amplitude of the received R.F. energy source appears on lines $A_o$-$A_n$.

Figure 5:
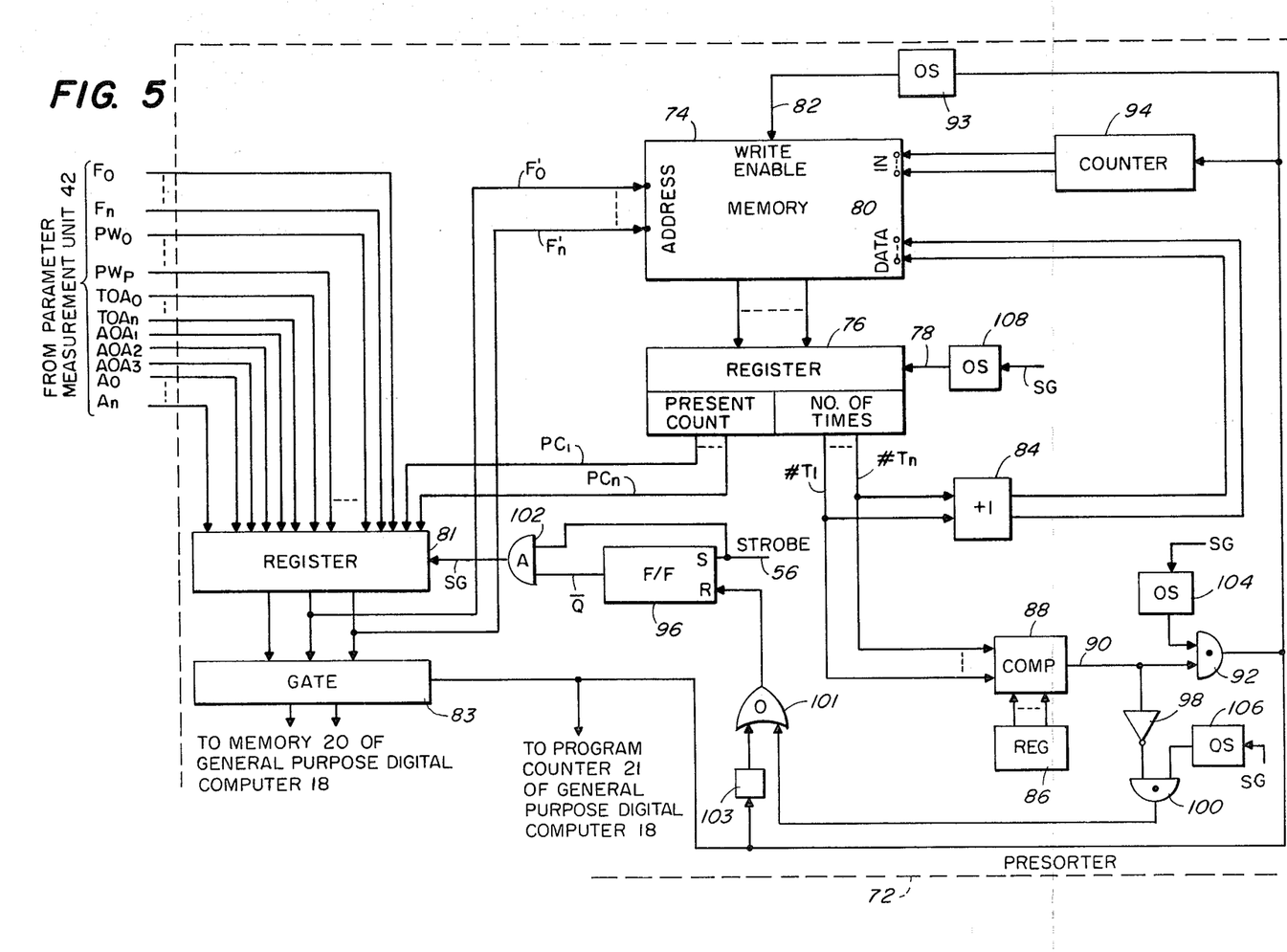
FIG. 5 is a block diagram of a presorter used in the ECM equipment shown in FIG. 2.

The digital words produced at the output of parameter measurement unit 40 (i.e. $F_o$-$F_n$, $TOA_o$-$TOA_n$, $PW_o$-$PW_p$ and $AOA_1$-$AOA_3$) along with the signal on strobe line 56 are fed to a presorter 72 (FIG. 5).

Before discussing the details of presorter 72 it is noted that here the frequency band of all R.F. energy sources 15a-15c is 4000 MHz wide from 5000 to 8999 MHz. Also measurement resolution of the frequency of a received signal is 1 MHz. Therefore, the frequency portion $F_o$-$F_n$ of the digital word produced by the parameter measurement unit 40 will be one of 4000 possible values, here ranging from 0000 (corresponding to a frequency of 5000 MHz) to $(3999)_{10}$ (corresponding to frequency 4999 MHz). For example, an incoming pulse at a frequency 6892 MHz will be converted into a binary signal on lines $F_o$-$F_n$ corresponding to $(1892)_{10}$. The conversion of frequencies 5000 to 8999 MHz to digital words 0000 to $(3999)_{10}$ is here performed by a conventional encoder (here included as a part of A/D converters 64a-64c).

Referring now to FIG. 5, presorter 72 is shown to include a conventional random access memory 74. Data stored in a location specified by the digital word on lines $F'_o$-$F'_n$ is read from such memory 74 and applied to a register 76, such data being stored in such register 76 in response to a "high" signal on line 78. Likewise, data applied to memory 74 on the data input terminal 80 is written into such memory 74 at the location specified by the digital word on lines $F'_o$-$F'_n$ in response to a "high" signal on the write enable line 82. As will become apparent, the read/write addressing for the memory 74 is related to the frequency associated with signals received from an R.F. energy source and therefore memory 74 is here adapted to have 4000 locations. The data stored in memory 74 (i.e. the digital words applied to the data input terminal 80) is, for reasons to become apparent, comprised of two portions. The first portion, hereinafter sometimes referred to as the "present count" portion, when stored in register 76 appears on lines $PC_1$-$PC_n$ and the second portion, hereinafter sometimes referred to as the "# of times" portion, when stored in register 76 appears on lines $\#T_1$-$\#T_n$. The lines $PC_1$-$PC_n$, together with the output of the parameter measurement unit 40, i.e. lines $F_o$-$F_n$, $PW_o$-$PW_p$, $AOA_1$-$AOA_3$; $TOA_o$-$TOA_n$, $A_o$-$A_n$, are fed to a register 81. It is first noted that the data on lines $TOA_o$-$TOA_n$, $F_o$-$F_n$, $PW_o$-$PW_p$, $AOA_1$-$AOA_3$, $A_o$-$A_n$ may be considered as a digital word representing various characteristics, i.e. time of arrival frequency, pulse width, angle of arrival, and amplitude, respectively, of a received signal associated with one of the R.F. sources 15a-15c. Digital words produced by the parameter measurement unit 40 are applied to the register 81 and such digital words are modified by the "present count" portion of the digital word stored in register 76 in order to facilitate the processing of data stored in the memory 20 of the general purpose digital computer 18 in a manner to be described. Suffice it to say here that the "present count" portion is used to modify the digital word associated with one of the R.F. energy sources produced by the parameter measurement unit 40 thereby to provide an indication of the location in such memory 20 of the previous digital word associated with such one of the R.F. energy sources. It should further be mentioned, as will be discussed later, that only a predetermined number (here 3) of digital words associated with a particular R.F. energy source will be passed to the computer 18 via gate 83. The number of words to be passed is selected in accordance with the number of samples from the same R.F. energy sources needed to establish pulse repetition interval (PRI) of such R.F. energy source. Such PRI is determined by comparing the times of arrival of signals from the same R.F. energy source. Generally, additional samples do not provide additional information and hence, not being required, are inhibited from passing to the general purpose computer 18 in a manner to be described in order to reduce the processing required by such computer.

Generation of the digital words to be stored in memory 74 is as follows: The "number of times" portion of the digital words stored in register 76 is fed via lines $\#T_1$-$T_n$ to: (1) a +1 adder 84, thereby to increment by one such digital word, and (2), to a comparator 88, which compares such "# of times portion" of such digital word with a predetermined number, here $(3)_{10}$, stored in register 86. The output of the +1 adder 84 serves as one portion of the data on input terminal 80. The output of such comparator 88 is fed, via line 90 and AND gate 92 to a counter 94 and to the write enable line 82 through a one shot multivibrator 93. The output of counter 94 provides the second portion of the data applied to input terminal 80. The output of AND gate 92 is also fed to OR gate 101 through a delay network 103. The output of comparator 88 is also fed to the reset terminal "R" of a flip/flop 96 through an inverter 98 and an AND gate 100 and an OR gate 101, as shown. The set terminal "S" of flip/flop 96 is coupled to the strobe line 56 (i.e. from the parameter measurement unit 40) such strobe line 56 being "high" in response to the reception of a signal from one of the R.F. energy sources 15a–15c as described in connection with FIG. 4. The output $\overline{Q}$ of flip/flop 96 and strobe line 56 are coupled to an AND gate 102 (as shown). The output of AND gate 102, i.e. line SG, is fed to a register 81 and AND gates 92 and 100 through one shot multivibrators 104, 106 respectively, as shown, and to line 78 via one shot multivibrator 108. It is here noted that when line SG goes "high" data applied to register 81 becomes stored therein. Also, the delay provided by one shot multivibrators 104, 106 (i.e. $\Delta_2$) is longer than the delay provided by one shot multivibrator 108 (i.e. $\Delta_1$).

In operation (assuming that the memory 74, the counter 94, the registers 76, 81 and flip/flop 96 have been reset to 0 by any conventional means, not shown) in response to the detection of radio frequency energy from one of such R.F. energy sources 15a–15c, strobe line 56 goes "high" and parameters associated with such R.F. energy source are converted to digital words by the parameter measurement unit 40 and are applied to register 81. Because flip/flop 96 has been reset, line $\overline{Q}$ is high, the "high" signal on strobe line 56 passes through AND gate 102 to line SG and the digital word generated by the parameter measurement unit 40 becomes stored in register 81. The frequency portion of the digital word stored in register 80 (i.e. the portion of the digital word on lines $F_o$–$F_n$) become coupled to memory 74 via line $F'_o$–$F'_n$ thereby to provide the address for such memory 74. Also, in response to a "high" signal on strobe line 56 the flip/flop 96 becomes set (i.e. line $\overline{Q}$ goes "low") and no other digital words produced by the parameter measurement unit 40 are able to be stored in register 80 until flip/flop 96 is reset by a "high" signal at the output of OR gate 101, to be described. A first short time, $\Delta_1$, after the line SG goes "high," register 76, in response to a "high" signal on line 78, stores a digital word read from memory 74 at the location designated by the digital word on lines $F'_o$–$F'_n$. Because the memory 74 had been reset to zero, as described, the digital word addressed by such memory 74 and now stored in register 76 is 00...0. A short time after the line 78 goes high, (i.e. a time $\Delta_2$ after line SG goes "high") the "number of times" portion of register 76 (i.e. 0...0) being less than the number stored in register 86 (i.e. $(3)_{10}$) causes comparator 88 to go "high." When a signal produced at the output of one shot multivibrator 102 goes high, i.e., a time $\Delta_2$ after line SG goes "high," counter 94 increments to 1 and shortly thereafter (i.e. because of one shot multivibrator 93) the write/enable line 82 goes "high." Further, the "high" signal produced at the output of AND gate 92 enables gate 83 to pass through such gate 83 to memory the digital word produced by the parameter measurement unit 40 modified by adding to the length of such word the "present count" portion of the digital word stored in register 76. Also, after such digital word is passed to memory 20 the flip/flop 96 becomes reset by a "high" signal produced by OR gate 101. The delay 103 is provided to account for the time it takes data to be stored in the memory 20 of the general purpose computer 18. However, alternatively, the signal out of AND gate 92 could be gated with a "memory transfer complete" signal produced in a conventional manner, by the general purpose computer 18. It is also noted that the "number of times" portion has been incremented by 1 by the +1 adder 84. Therefore, in response to a "high" signal on the write enable line 82, memory 74 stores in location provided by the digital word on line $F'_o$–$F'_n$ the data 00 ...1 00...1. The process continues until the "number of times" portion of the digital word in register 76 is equal to $(3)_{10}$. Then, a time $\Delta_2$ after line SG goes "high," counter 94 will not increment, write enable line 82 will not go "high," gate 83 will not be enabled and hence the digital word produced by the parameter measurement unit 40 will not pass to the general purpose computer through gate 83. Rather, AND gate 100 produces a "high" signal which passes to OR gate 101 to reset flip/flop 96 for reasons discussed above.

Let the following example be considered: The R.F. energy sources 15a, 15b, 15c occur in the following sequence:

15a, 15c, 15b, 15b, 15a, 15b, 15a, 15b, 15c, 15c 15a. Let it further be assumed that the R.F. energy source 15a has a frequency $f_1$, the R.F. energy source 15b has a frequency $f_2$ and the R.F. energy source 15c has a frequency $f_3$ and that memory 74, counter 94, registers 76, 81 and flip/flop 96 have been set to 0 and the program counter is set to 0 by any conventional means (not shown).

In response to the first strobe signal on line 56 the first digital word $PMU_1$ (here associated with R.F. energy source 15a) produced by the parameter measurement unit 40 becomes stored in register 81. Data stored in the location corresponding to frequency $f_1$ of memory 74 is then read therefrom and a short time $\Delta_1$, later becomes stored in register 76. The "present count" portion of such data is 0 and the "# of times" portion is incremented to 1 by the +1 adder 84. Comparator 88 goes "high," and a short time, $\Delta_2$, after the line SG goes "high," counter 94 increments to 1. Then memory 74 stores 1 as the "present count" and 1 as the "# of times" in location associated with frequency $f_1$. Also, the digital word $PMU_1$ is modified by the "present count" portion of the word stored in register 76 (i.e. 0) to form the digital word $PMU_10$ which passes from register 81, through gate 83, to memory 20. A program counter 21, included in the general purpose computer 18 for addressing such memory 20 in a conventional manner, is incremented to 1 in response to the "high" signal produced by the AND gate 92. Therefore, the digital word $PMU_10$ becomes stored in location 1 of memory 20. (This process is illustrated in the Table below).

| R.F. Energy Source | Digital Word From Par. Meas. Unit 40 | Data Read From Memory 74 | | | Data Written Into Memory 74 | | | Data Written Into Memory 20 | | |
|---|---|---|---|---|---|---|---|---|---|---|
| | | Address (Location) | Pres. Count Portion | # Times Portion | Loc. | Pres. Count | #Times | Loc. | Modified Dig. | Word |
| $15_a$ | $PMU_1$ | $f_1$ | 0 | 0 | $f_1$ | 1 | 1 | $(1)_{10}$ | $PMU_1$ | 0 |
| $15_c$ | $PMU_2$ | $f_3$ | 0 | 0 | $f_3$ | $(2)_{10}$ | 1 | $(2)_{10}$ | $PMU_2$ | 0 |
| $15_b$ | $PMU_3$ | $f_2$ | 0 | 0 | $f_2$ | $(3)_{10}$ | 1 | $(3)_{10}$ | $PMU_3$ | 0 |
| $15_b$ | $PMU_4$ | $f_2$ | $(3)_{10}$ | 1 | $f_2$ | $(4)_{10}$ | 2 | $(4)_{10}$ | $PMU_4$ | $(3)_{10}$ |
| $15_a$ | $PMU_5$ | $f_1$ | 1 | 1 | $f_1$ | $(5)_{10}$ | 2 | $(5)_{10}$ | $PMU_5$ | $(1)_{10}$ |
| $15_b$ | $PMU_6$ | $f_2$ | $(4)_{10}$ | $(2)_{10}$ | $f_2$ | $(6)_{10}$ | 3 | $(6)_{10}$ | $PMU_6$ | $(4)_{10}$ |
| $15_a$ | $PMU_7$ | $f_1$ | $(5)_{10}$ | $(2)_{10}$ | $f_1$ | $(7)_{10}$ | 3 | $(7)_{10}$ | $PMU_7$ | $(5)_{10}$ |
| $15_b$ | $PMU_8$ | $f_2$ | $(6)_{10}$ | $(3)_{10}$ | — | — | — | — | — | — |
| $15_c$ | $PMU_9$ | $f_3$ | $(2)_{10}$ | 1 | $f_3$ | $(8)_{10}$ | 2 | $(8)_{10}$ | $PMU_9$ | $(2)_{10}$ |
| $15_c$ | $PMU_{10}$ | $f_3$ | $(8)_{10}$ | $(2)_{10}$ | $f_3$ | $(9)_{10}$ | 3 | $(9)_{10}$ | $PMU_{10}$ | $(8)_{10}$ |
| $15_a$ | $PMU_{11}$ | $f_1$ | $(7)_{10}$ | $(3)_{10}$ | — | — | — | — | — | — |

In response to the next received signal (here from R.F. energy source 15c), the digital word $PMU_2$ is produced by the parameter measurement unit 40. Data stored in the location corresponding to frequency $f_3$ of memory 74 is then read therefrom and a short time, $\Delta_1$ later becomes stored in register 76. The "present count" portion of such data is 0 and the "#of times" portion of such data is also 0. The "number of times" portion is incremented to 1 by the +1 adder 84. Comparator 88 goes "high" and a short time, $\Delta_2$, after line SG goes "high," counter 94 increments to $(2)_{10}$. Then memory 74 stores $(2)_{10}$ as the "present count" and 1 as the "# of times" in location $f_3$. Also, the digital word $PMU_2$ is modified by the "present count" portion of the word stored in register 76 (i.e. 0) to $PMU_20$ which passes from register 81, through gate 83, to memory 20. The program counter 21 increments to location $(2)_{10}$ thereby to store such modified digital word $PMU_20$ in location $(2)_{10}$ of memory 20. In response to the next received signal (i.e. here from R.F. energy source 15b), the digital word $PMU_3$ is produced by the parameter measurement unit 40. Data stored in location corresponding to frequency $f_2$ of memory 74 is then read therefrom and a short time, $\Delta_1$, later becomes stored in register 76. The "present count" portion of such data is 0 and the "# of times" portion of such data is 0. The "# of times" portion is incremented to 1 by the #1 adder 84. Comparator 88 goes "high" and a short time, $\Delta_2$, after line SG goes "high," counter 94 increments to $(3)_{10}$. Then memory 74 stores $(3)_{10}$ as the "present count" and 1 as the "# of times" in the location corresponding to the frequency $f_2$. Also, the digital word $PMU_3$ is modified by the "present count" portion of the word stored in register 76 (i.e. 0) to $PMU_30$ which passes to memory 20 and becomes stored in location $(3)_{10}$ of such memory.

In response to the next received signal (here from R.F. energy source 15b) the digital word $PMU_4$ is produced by the parameter measurement unit 40. Data stored in the location corresponding to the frequency $f_2$ of memory 74 is read therefrom and a short time, $\Delta_1$, later becomes stored in register 76. The "present count" portion of such data is $(3)_{10}$ and the "# of times" portion of such data is 1. The "# of times" portion is incremented to $(2)_{10}$ by the +1 adder 84. Comparator 88 goes "high" and a short time, $\Delta_2$, after line SG goes "high," counter 94 increments to $(4)_{10}$. Then memory 74 stores $(4)_{10}$ as the "present count" and $(2)_{10}$ as the "# of times" in location $f_2$. Also, the digital word $PMU_4$ modified by the "present count" portion of the word stored in register 76, (i.e. $(3)_{10}$) passes from register 81, through gate 83, to location 4 of memory 20. It should be noted that the "present count" portion which modified word $PMU_4$ (i.e. $(3)_{10}$) points to the location in memory 20 of the preceding digital word associated with R.F. energy source 15b.

The process continues as described above and as outlined in the Table presented above.

It is noted that in response to the fourth signal from the R.F. energy source 15b (i.e. digital word $PMU_8$), comparator 88 goes "low" thereby inhibiting digital word $PMU_8$ from passing to memory 20. Also, counter 94 does not get incremented, data is not read from memory 74, and program counter 21 does not get incremented. A similar operation occurs in response to the fourth signal from R.F. energy source 15a (i.e. digital word $PMU_{11}$.

Referring again to the Table, it is evident that only the predetermined number (here 3) of digital words associated with any one R.F. energy source will pass to the general purpose digital computer 18 for processing thereby. Therefore, once such computor has a sufficient number of pulses (i.e. here 3) from the same R.F. energy source to compute the pulse repetition interval (i.e. PRI) of such source, additional pulses from such source will not cause the computer 18 to operate on them and such computer will be interrupted only when a signal from a "new" R.F. energy source is received.

Further, the digital words stored in memory 20 are modified by including, in addition to the digital word produced by the parameter measurement unit 40, a "pointer" which indicates the location in such memory 20 of the previous digital word associated with the same R.F. energy source. For example, reading from the bottom of the Table to the top: Locations 9, 8 and 2 contain digital words $PMU_{10}$, $PMU_9$ and $PMU_2$, respectively (all from R.F. energy source 15c); locations 7, 5 and 1 contain digital words $PMU_7$, $PMU_5$, and $PMU_1$ (all from R.F. energy source 15a); and locations 6, 4 and 3 contain digital words $PMU_6$, $PMU_4$ and $PMU_3$ (all from R.F. energy source 15b).

Having described a preferred embodiment of this invention, it is evident that other embodiments incorporating its concepts may be used. For example, other frequency bands may be considered with corresponding changes in the size of the memory 74. Further, more or fewer parameters may be measured by the parameter measurement unit 40. Still further, addressing of memory 74 may be by some other parameter, such as angle of arrival, rather than frequency as described. It is felt, therefore, that this invention should not be restricted to the disclosed embodiment, but rather should be limited only by the spirit and scope of the appended claims.

What is claimed is:

1. In a radio frequency receiver system adapted to receive a sequence of signals from a plurality of radio frequency energy sources and convert such signals into a corresponding sequence of digital words, each one of such words having portions representing different characteristics of such corresponding source, a selected one of the portions representing a characteristic of such source which provides an identification of such source, and including a digital computer having a memory adapted to store in locations thereof digital words coupled thereto through an improved signal processing apparatus, such signal processing apparatus comprising:

(a) means, responsive to the selected one of the portions of the digital words, for enabling a predetermined plurality of the sequence of digital words associated with an identified one of the radio frequency energy sources to become stored in selected locations of such memory and for inhibiting from storage in such memory subsequent ones of the sequence of digital words from the same identified one of the radio frequency energy sources; and, (b) means for modifying the digital words passed to such memory by including an additional portion to each such digital word passed to the memory, such additional portion providing an indication of the location in such memory of a previously stored digital word associated with the same identified one of the radio frequency energy sources.

2. The signal processing apparatus recited in claim 1 wherein the enabling means includes:

(a) means, responsive to the selected one of the portions of the sequence of digital words, for counting the number of digital words associated with the same identified source;

(b) means for comparing the counted number of digital words with a predetermined number; and (c) gating means responsive to the comparing means for passing the digital words associated with the same identified source to the memory when the counted number of digital words is less than the predetermined number, and for inhibiting subsequent digital words from the same identified source to pass to the memory when the counted number of digital words is greater than the predetermined number.

3. The signal processing apparatus recited in claim 2 including means for storing the digital words passed to the memory in sequential locations thereof, and means, responsive to the selected one of the portions of the digital words, for producing a second digital word representative of the number of the last digital word in the sequence passed to the digital computer which was associated with the same identified source and wherein the modifying means modifies each digital word by adding as an additional portion to such digital word the second digital word provided by the providing means to provide an indication of the memory location of the previous digital word associated with the same identified source stored in such memory.

4. In combination:

(a) means for receiving a sequence of radio frequency signals from a plurality of radio frequency sources;

(b) means for measuring a plurality of parameters of each one of such received signals and for converting such parameters into different portions of a corresponding digital word, each digital word being associated with each received signal producing a sequence of digital words corresponding to the sequence of received radio frequency signals;

(c) digital computer means for processing digital signals passed thereto; and (d) means fed by the measuring and converting means for enabling a predetermined plurality of the digital words associated with each one of the plurality of radio frequency sources having the same parameter as represented by a selected one of the portions of the corresponding digital words to pass to the digital computer means and for inhibiting subsequent ones of such digital words having the same parameter as represented by the selected one of the portions of the corresponding digital words from passing to such digital computer means.

5. The combination recited in claim 4 wherein the enabling means includes means for modifying the digital words passed to the digital computer means to enable such modified digital words to provide an indication of the location in a memory included in such digital computer means of the previously stored digital word associated with such one of the radio frequency sources.

6. The combination recited in claim 5 including a memory means for storing the present count of a received signal having a particular one of the measured parameters and the number of times such received signal having such particular one of the measured parameters has been received.

7. In a radio frequency signal receiving system, the improvement comprising:

(a) means for forming a sequence of digital words in response to a corresponding sequence of received signals, such received signals being associated with a plurality of different radio frequency energy sources, each one of such digital words having a plurality of portions, each portion being associated with a corresponding one of a plurality of different characteristics of each one of the radio frequency sources, a selected one of such portions being associated with a characteristic which is different for each one of the sources;

(b) a digital memory for storing a second plurality of digital words, each one of such second plurality of digital words having: a different addressable location, each location being associated with one of the plurality of radio frequency energy sources as represented by the characteristic associated with the selected one of the portions of the digital words; and a field representative of the number of times a digital word has been previously stored in the digital memory at the location of such one of the second plurality of stored digital words;

(c) register means for sequentially storing each one of the sequence of digital words and for coupling the selected portion of the digital word stored in the register means to the digital memory to address the digital word in such memory having a location associated with the radio frequency energy source corresponding to the digital word stored in the register means;

(d) means, responsive to the field of an addressed digital word being read from the digital memory, for producing a control signal indicating whether the addressed digital word currently being read from the digital memory had previously been stored in such digital memory greater than or less than a predetermined number of times;

(e) means, responsive to the control signal, for storing a digital word in the addressed location of the digital memory only if the control signal indicates that the digital word currently being addressed and read from the digital memory had been previously stored in such memory less than the predetermined number of times, the digital word being stored in the digital memory having the field of the digital word currently being read from the memory incremented; and (f) gating means, fed by the register means and responsive to the control signal, for enabling the digital word currently fed to such gating means to pass to a digital computer only if the field of the addressed digital word currently being read from the digital memory indicates that a digital word had been stored in the digital memory at the location of the addressed digital word less than the predetermined number of times to enable only a predetermined number of digital words associated with each one of the radio frequency energy sources to pass to the digital computer and to inhibit all subsequent digital words associated with such one of the radio frequency energy sources from passing to such digital computer.

8. The system recited in claim 7 wherein:

the output of the gating means is coupled to a second digital memory included in the digital computer;

each one of the second digital words stored in the first-mentioned digital memory includes a second field representative of the number in the sequence of the digital words previously passed to the computer of a digital word associated with the same source as the source associated with the location of such one of the second digital words and wherein the system includes:

means for coupling the second field of each addressed one of the second digital words to the register means to modify each digital word stored in the register means by adding to such digital word the second field, such second field providing an indication of the location in the digital computer memory of a previously stored digital word associated with the same radio frequency energy source.

* * * * *

UNITED STATES PATENT OFFICE
CERTIFICATE OF CORRECTION

Patent No. 4,217,580     Dated August 12, 1980

Inventor(s) Oscar Lowenschuss

It is certified that error appears in the above-identified patent and that said Letters Patent are hereby corrected as shown below:

Column 3, line 30, delete --countermeasure-- and replace with --countermeasures--;

Column 4, line 35, delete --voltage-- and replace with --voltages--;

Column 4, line 52, delete --words-- and replace with --word--;

Column 6, line 37, delete --word-- and replace with --words--;

Column 7, line 44, delete --line-- and replace with --lines--;

Column 10, line 37, delete --computor-- and replace with --computer--.

Signed and Sealed this

Twenty-eighth Day of April 1981

[SEAL]

Attest:

RENE D. TEGTMEYER

Attesting Officer     Acting Commissioner of Patents and Trademarks